May 5, 1964

L. C. JENSEN 3,131,813

LITTER LOCKER

Filed Aug. 1, 1962

INVENTOR.
LARS C. JENSEN
BY Robert E Breidenthal
ATTORNEY

May 5, 1964

L. C. JENSEN 3,131,813

LITTER LOCKER

Filed Aug. 1, 1962

INVENTOR.
LARS C. JENSEN
BY Robert E Breichenthal
ATTORNEY

United States Patent Office 3,131,813
Patented May 5, 1964

3,131,813
LITTER LOCKER
Lars C. Jensen, 2482 Riverlawn Drive, Wichita, Kans.
Filed Aug. 1, 1962, Ser. No. 214,125
7 Claims. (Cl. 206—19.5)

The present invention relates to new and useful improvements in litter receptacles or lockers, and more particularly pertains to a litter locker construction for automobile use wherein a removable locker is pivotally supported on an automobile seat for selectively positioning the same in a retracted unobstructive position below the seat and an exposed position where the same is accessible for insertion of litter.

For reasons of public health and safety, and for the prevention of eyesores and avoidance of expensive trash and litter cleaning operations, considerable public educational efforts are now being made in order to obtain compliance by the motoring public with campaigns against throwing trash and litter from automobiles on streets and highways. Indeed, many ordinances and statutes establish substantial penalties for throwing trash and litter from automobiles.

Noncompliance with such campaigns, ordinances and statutes is probably as much or more attributable to the inconvenience of storing litter in an automobile until it can be disposed of in an approved manner, rather than being attributable to untidy habits, ignorance and flagrant disregard for the interests of others and/or of the law.

Such inconvenience as is encountered in the utilization of litter storage devices presently available or proposed involves one or more factors such as presenting an unsightly appearance (of the device itself and/or of its contents), occupying an obstructive position that interferes with the freedom of movement or the positioning of automobile occupants, occupying a position that is visually obstructive as of instruments on the dashboard, being easily dislodged from its position, and presenting difficulties as to litter insertion or as to the removal of litter therefrom. The initial and/or maintenance costs of available or proposed litter storage devices can also be an important factor discouraging their use, thereby tending to frustrate the public will.

The primary object of the present invention is to provide a litter locker that will be convenient to use, that will avoid the inconveniences previously set forth, and which will be reasonable in initial cost and be especially inexpensive to maintain.

Another important object of the invention is to provide a litter locker construction that can be furnished as an attachment for installation in automobiles or provided as a part of original automotive equipment, such litter locker being such as to occupy normally a retracted position in the space intermediate an automobile seat and the floor, and to be pivotally mounted for swinging from the retracted position thereof to an extended position forward of the automobile seat for reception of litter, such operation being unaffected by any adjustment of the automobile seat forward or rearward.

Still another important object of the invention is to provide a litter locker from which accumulated trash and litter can be efficaciously removed, for example, as a part of the service routine of a filling station.

Yet another important object of the invention is to provide a pivotally mounted litter locker incorporating a removable and disposable locker of low cost suitable for free distribution as an advertising media, thereby assuring a low maintenance cost to the user with consequent assurance of continued usage of the litter locker.

Other features, objects and advantages of the invention will subsequently become apparent.

Broadly, the present invention involves a litter locker construction for automobile use comprising a locker receiver, a locker releasably retained in said receiver, said locker having an opening therein adapted for the insertion of litter thereinto, said receiver having a front wall provided with a pull, and means pivotally secured to the receiver adjacent the front wall thereof for mounting the receiver on an automobile seat with the receiver being adapted to swing outwardly from a retracted position beneath the seat to an extended position exposing the opening in the locker. Preferably also, the invention involves the additional provision of means for releasably retaining he receiver in at least one relatively fixed position relative to said means.

One aspect of the present invention involves the mounting means being pivotally secured to the receiver for pivotal movement about a substantially vertical axis, whereas another aspect of the invention involves said mounting means being pivotally secured to the receiver for pivotal movement about a horizontal axis.

Another aspect of the invention involves an automobile having a seat spaced above the floor thereof, a litter locker construction comprising a receiver normally disposed in a retracted position in the space intermediate the seat and the floor, said receiver having a front portion adjacent the front edge of the seat provided with a pull, a locker removably positioned in the receiver, said locker having an opening in its top adapted for insertion of litter thereinto, and means attached to the seat and pivotally connected to the receiver whereby the receiver and the locker positioned therein can be pivotally swung from the retracted position to an extended position in front of the seat exposing the opening in the locker. This aspect of the invention can also involve the means attached to the seat being pivotally connected to the receiver about a vertical axis, with the automobile including a door immediately adjacent to and for direct access to the seat, said vertical axis being at the lateral end of the receiver remote from the door, with the pull being intermediate the vertical axis and the door.

The invention will be best understood in the light of the following description of preferred embodiments thereof, taken in conjunction with the accompanying drawings illustrative thereof, wherein.

Figure 1:
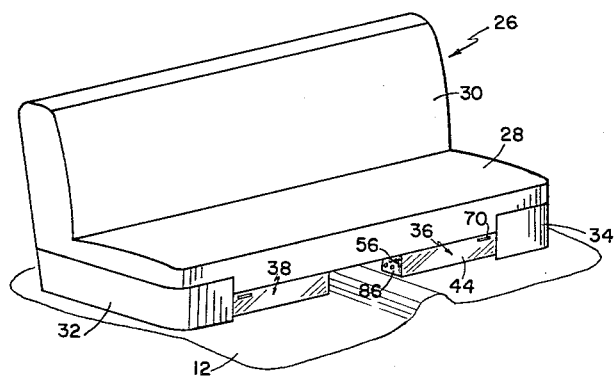
FIGURE 1 is a perspective view of an automobile seat provided with a pair of litter lockers according to the invention, such litter lockers being shown in their retracted positions, and this view also partially illustrating the floor of the automobile.

Referring now to the drawings, wherein like numerals designate like parts throughout the various views, attention is first directed to the form of the invention shown in FIGURES 1 through 7, inclusive, the reference numeral 10 designates generally a portion of a conventional passenger automobile comprised of a floor 12, doors 14 and 16 hinged respectively at 18 and 20 to side walls 22 and 24.

An automobile seat structure is designated generally at 26, the same being comprised of a seat portion 28 and a back portion 30. The seat structure 26 is conventionally mounted at 32 and 34 on the automobile floor 12, and such mounting can be of the conventional character such that the seat portion 28 and the back portion 30 of the seat structure 26 can be adjustably moved as a unit forwardly or backwardly and secured in adjusted position. Although the seat structure 26 is shown as a unitary seat extending between the doors 14 and 16, the practice of the invention is not limited to such seat constructions, inasmuch as practice of the invention has equal applicability to conventional seat constructions wherein the back portion 30 is comprised of two separate parts or portions each of which is individually adjustable as to inclination, as well as to conventional seat constructions wherein both the seat portion 28 and the back portion 30 are in two sections and make up two individual side-by-side units (each of which can be independently adjustable as a unit forward and backward), such as conventional bucket seats, etc. For the practice of the invention it is only essential that there be some vertical spacing between the automobile floor 12 and a part of the seat portion 28 adjacent the forward edge of the latter. It is in such space or spaces intermediate the seat structure 26 and the floor 12 that one or more litter lockers such as those designated generally at 36 and 38 are received.

Inasmuch as the litter lockers 36 and 38 are mirror images of each other, and are therefore essentially identical, a detailed description of the litter locker 36 will suffice for both of the litter lockers 36 and 38. The litter locker 36 comprises a locker receiver designated generally at 40 in FIGURES 4 and 5, and a locker designated generally at 42 in FIGURES 6 and 7 that is removably received in the locker receiver 40.

The locker receiver 40 comprises joined front and bottom walls 44 and 46, one lateral end of the front wall 44 being provided with a rearwardly extending flange 48. For a purpose presently to appear, the rear edge of the bottom wall 46 is provided with a spaced pair of upstanding fingers 50 and 52 that are curved as shown and which possess at least a minor degree of resiliency so as to constitute leaf springs.

Though the front wall 44, the bottom wall 46, the flange 48, and the spring leaves or fingers 50 and 52 can each be separately made and fastened to each other during assembly of the locker receiver 40, the spatial arrangement of such components is such that they can be formed from a single stamping of sheet metal stock, such as moderately hard sheet aluminum which can afford sufficient resiliency for the spring fingers 50 and 52 and yet not break on making the bends at the junctures of the front and bottom walls 44 and 46 and at the juncture of the front wall 44 and the flange 48.

Means is pivotally connected to the receiver 40 for mounting the latter on the underside of the seat portion 28 of the seat structure 26. Such means comprises a vertically extending hinge pin 54 that is rotatably received through a hinge 56 rigidly fixed to the flange 48 as by rivets or the like, not shown. The upper end of the hinge pin 54 is provided with a clamping device 58 adapted to be clamped securely to the underside of the seat portion 28 of the seat structure 26, whereby the hinge pin 54 is secured against rotation and held in a fixed vertical position relative to the seat portion 28 of the seat structure 26. The lower end portion of the hinge pin 54 is L-shaped and includes a short horizontal portion 60 (see FIGURE 5) that extends toward space overlying the bottom wall 46 to the rear of the flange 48. A metallic strap 62 is fixedly secured to the flange 48 as by rivets 64, and the strap 62 includes a rearwardly extending arcuate portion 66 that partially embraces the hinge pin 54. In addition, the arcuate portion 66 of the strap 62 has a serpentine lower edge 68 that overlies and rests in engagement on the horizontal portion 60 of the hinge pin 54.

The arrangement is such that the receiver 40 can be pivoted or oscillated about the vertical axis defined by the hinge pin 54 with the serpentine edge 68 of the strap 62 sliding in engagement with the horizontal portion 60 of the hinge pin 54. Such oscillatory or pivotal motion of the receiver 40 is accompanied by a slight amount of vertical reciprocation of the receiver 40 on the hinge pin 54, because of the serpentine configuration of the lower edge 68 of the strap 62. It will be noted that some degree of force is required to pivotally displace the locker receiver 40 from any of its pivoted positions that correspond with it assuming a lowermost position during the aforementioned reciprocation of the receiver 40 relative to the hinge pin 54. Accordingly, the strap 62 with its arcuate portion 66 having a serpentine lower edge 68 in conjunction with the horizontal portion 60 of the hinge pin 54 constitute means for releasably retaining the receiver 40 in one or more selected angular positions about the vertical axis defined by the hinge pin 54 with respect to the seat structure 26, it being noted that the serpentine edge 68 can include as few or as many undulations as desired, and that such undulations can be of differing magnitudes.

The front wall 44 of the locker receiver 40 is provided with a pull on the front face thereof at a position adjacent the end of the front wall 44 remote from the hinge pin 54. Preferably, the pull 70 does not define an opening in which the fingers could be caught and thereby constitute a motoring hazard, but can simply be a rib that is of greater transverse thickness outwardly from the front wall 44 (not specifically shown).

For the sake of appearance, resistance to corrosion, and lightness of weight, it is preferred that the front wall 44, the bottom wall 46, the spring fingers 50 and 52, and the flange 48 be of aluminum though other metals can be used for such components. It is not essential that such components be metallic, and material such as plastics and wood can be employed where suitable. For reasons of necessary strength, it is preferred that the hinge pin 54, the horizontal portion 60 thereof, the clamping device 58, and the strap 62 be metallic, such as steel, however, it will be apparent to those skilled in the art that any other materials possessing adequate strength can be used.

Figure 6:
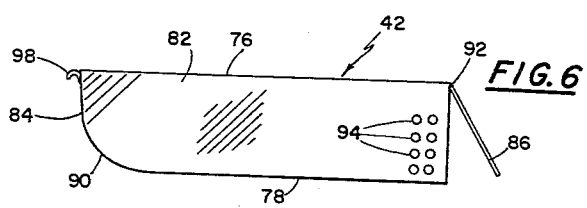
FIGURE 6 is a side elevational view of a locker suitable for use with the locker receiver shown in FIGURE 4, such locker being shown with an end wall thereof being swung to an open position.
Figure 7:
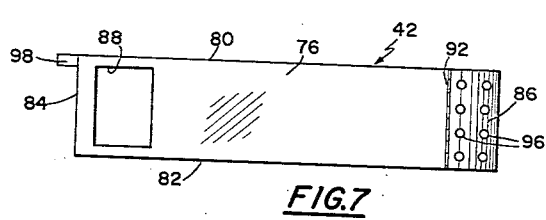
FIGURE 7 is a top plan view of the locker shown in FIGURE 6.

Attention is now directed to the locker 42 illustrated in FIGURES 6 and 7. The locker 42 is of generally rectangular configuration and includes spaced top and bottom walls 76 and 78, spaced side walls 80 and 82, and spaced end walls 84 and 86 to define a hollow enclosure for trash and litter.

The top wall 78 is provided with an opening 88 adjacent the end of the locker 42 remote from the end wall 86, such opening 88 being for the purpose of receiving litter and trash to be stored in the locker 42. As clearly shown in the drawings, the end wall 84 and the bottom wall 78 merge along a smooth curve 90, such smooth curve 90 being directly below the opening 88 so that trash and litter dropped in the opening 88 tend to move in the locker 42 toward the end wall 86. The end wall 86 is hinged to the top wall 76 at 92, the arrangement being such that the end wall 86 normally occupies a limiting position in which the same engages and closes the end of the locker 42 opposite the end wall 84, and can be swung from such limiting position to open the end of the locker 42 remote from the end wall 84. The end wall 86 is shown in an intermediate position partially opening the locker 42. The hinged end wall 86 therefore constitutes one method by which trash and litter accumulated in the locker 42 can be removed.

In lieu of the end wall 86 being hingedly connected to the locker 42 rather than fixedly secured in a locker closing position, or in addition to the end wall 86 being hingedly connected, the locker 42 can be and is shown as being provided with a plurality of small openings adjacent the end thereof remote from the end wall 84 and the opening 88. Such plurality of small openings can be comprised of a set of openings 94 and the side walls 80 and 82, and a set of openings 96 in the end wall 86. If desired, additional sets of openings (not shown) can be provided in the top and bottom walls 76 and 78 of the locker 42 adjacent the end wall 86. The sets of openings 94 and 96 are of utility in that they facilitate yet another method by which accumulated litter and trash can be removed from the locker 42. Such other method of discharging an accumulation of trash and litter from within the locker 42 entails placing the inlet end of the suction hose of a vacuum cleaner (not shown) adjacent the opening 88 or inserting the inlet end of such hose into the locker 42 through the opening 88 to withdraw accumulated trash and litter from within the locker 42. It will be observed that such removal of accumulated trash and litter from within the locker 42 is facilitated by streams of air entering the locker 42 through the sets of openings 94 and 96 under the influence of the partial vacuum created in the locker 42 on operation of the vacuum cleaner, with the result that such streams of air entering the locker 42 at a position remote from the opening 88 causes such streams of air to flush trash and litter from along the length of the locker 42 toward the inlet end of the vacuum hose. The curve 90 facilitates vacuum cleaning of the locker 42 by streamlining the flow of flushing air, and prevents retention of trash and litter at any sharp juncture of walls 78 and 84. If the vacuum method of emptying the locker 42 is to be used essentially exclusively, the sets of openings 94 and 96 are retained, and the end wall 86 can be fixedly secured in locker closing position rather than being hingedly connected to the locker 42. On the other hand, if reliance on the vacuum method of cleaning the locker 42 is not to be made, the sets of openings 94 and 96 can be omitted, with the end wall 86 being hingedly connected to the locker 42 rather than being fixedly secured thereto. Preferably, for reasons of flexibility of choice of cleaning methods both the features of the hinge 92 and the sets of openings 94 and 96 are retained, it being noted that the sets of openings 94 and 96 serve the ancillary function of affording some degree of ventilation for the interior of the locker 42.

The locker 42 can be made of materials of durable nature so that the same can be used for many cycles of trash and litter accumulation and cleaning, as well as occasional washing with water and detergents. Such long life can be obtained by making the locker 42 of metals, such as aluminum, or preferably of synthetic resins or plastics. When the locker 42 is to be made of a plastic material, it is preferred that the plastic material used be of tough character and relatively non-breakable, such as polyethylene. When the locker 42 is to be made of plastics, in the interests of economy and corrosion resistance it is preferred that the eyes or loops of the hinge 92 be made of such plastic materials and that the hinge pin be of corrosion resistant material such as stainless steel.

The locker 42 need not be made of materials as expensive as metals or plastics, and can be made of such inexpensive materials as cardboard or pasteboard, in which event the hinge 92 can simply be a flexible bend in the cardboard with the top wall 76 and the end wall 86 being integral. If the locker 42 is made of cardboard, it is preferred that the same be given some waterproofing treatment so as to make the same moisture resistant and less liable to softening. Such waterproofing can consist of the cardboard being treated with paraffin or impregnated with or coated with a water-resistant synthetic resin much in the manner that cardboard milk cartons are presently treated.

The locker 42 is releasably retained in the locker receiver 40, the normal position being such that the walls 80 and 78 of the locker 42 are seated flush against the walls 44 and 46, respectively, of the locker receiver 40. The end wall 86 of the locker 42 is seated against the flange 48 of the receiver 40 when the end wall 86 is in locker closing position, it being noted that the flange 48 retains the end wall 86 in locker closing position. The locker 42 and the locker receiver 40 are releasably retained in such assembled relationship by the finger springs 50 and 52 bearing against the side wall 82 of the locker 42. The shape of the finger springs 50 and 52 is such that the locker 42 can be inserted and removed from the locker receiver 40 solely by vertical movement of the locker 42. The shape of the finger springs 50 and 52 is also such that the locker 42 can be inserted and removed from the locker receiver 40 by horizontal movement of the locker 42 towards and away from the flange 48 in a direction parallel to the juncture of the walls 44 and 46 of the locker receiver 40.

To facilitate the last-described mode of insertion and removal of the locker 42, the latter is provided with a finger pull 98 adjacent the upper edge of the end wall 84. If desired, the finger pull 98 can be adjacent the side wall 80, as shown, or adjacent the side wall 82 or at any intermediate position.

Figure 2:
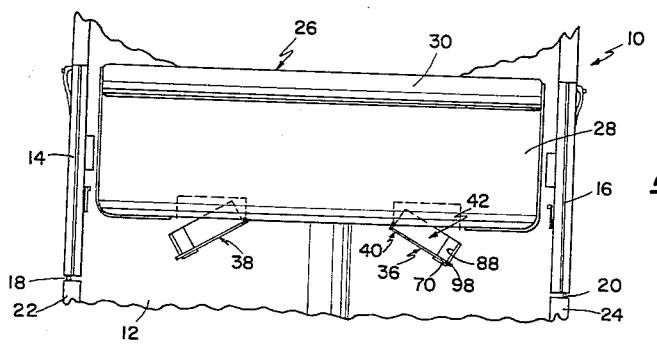
FIGURE 2 is a top plan view of the structure shown in FIGURE 1, with the litter lockers being shown as pivoted to their extended positions from their retracted positions shown in dashed outline, this view also showing a portion of the sidewalls of the automobile and the doors.

The locker receiver 40 and the locker 42 are shown in assembled relation and mounted in depending relation upon the seat portion 28 of the seat structure 26 in FIGURES 1 and 2, it being noted that the litter locker 36 constituted thereof is vertically spaced sufficiently from the seat portion 28 and the automobile floor 12 for the receiver 40 and the locker 42 to swing from the retracted position of such components shown thereof in FIGURE 1 (such retracted position also being shown in dashed outline in FIGURE 2), to the extended position shown thereof in FIGURE 2. In the retracted position of the litter locker 36, the front wall 44 of the locker receiver 40 is approximately even or flush with the front edge of the seat portion 28, with the balance of the locker receiver 40 and the locker 42 being disposed in the space below the seat portion 28. When the litter locker 36 is swung to its extended position as through the use of the pull 70, the portion of the receiver 40 and the locker 42 remote from the hinge pin 54 moves forwardly of the seat portion 28 so as to expose the opening 88 in the locker 42 for convenient insertion of trash and litter into the locker 42. The serpentine edge 68 of the strap 62 is such that the litter locker 36 is releasably retained in the position shown thereof in FIGURE 1, and such serpentine edge 68 can also be such that the litter locker 36 is releasably retained in the position shown thereof in FIGURE 2. Of course, the serpentine edge 68 can be such that the litter locker 36 can be releasably retained in extended positions other than that shown.

It is important to note that the litter locker 36 is adjacent the door 16 of the automobile, and that the hinge 54 is at the end of the litter locker 36 remote from the door 16. The arrangement is such that the litter locker 36 swings from its retracted position to its extended position towards the door 16, this being considered important in that a service attendant at a filling station can most conveniently through the door 16 empty the locker 42 of its accumulation of trash and litter by either of the two methods hereinbefore outlined for such purpose. It will be noted that a person standing outside the automobile can easily through the door 16 insert a vacuum hose in the opening 88 and into the interior of the locker 42, or alternatively the person can easily withdraw the locker 42 from the receiver 40 by the use of the pull 98 so as to remove trash therefrom and then reinsert the locker 42 in the receiver 40. It will be noted that the comments made with respect to the relationship existing between the litter locker 36 and the door 16 also applies to the litter locker 38 and the door 14 by virtue of the symmetrical placement of the litter locker 38 with respect to the door 14.

It will be appreciated, as mentioned previously, that the litter lockers 36 and 38 can be mounted on separate seats and that the litter lockers 36 and 38 do not occupy physically or visually obstructing positions when they are in their retracted positions. Furthermore, the litter lockers 36 and 38 do not constitute significant visual obstructions when they are in their extended positions, and that in their extended positions they constitute obstructions to only a minimal extent, inasmuch as they are exposed in positions disposed substantially behind the normal positions occupied by the feet of the persons sitting on the seat structure 26 and are well below and behind the thigh and calf portions of the legs.

Figure 8:
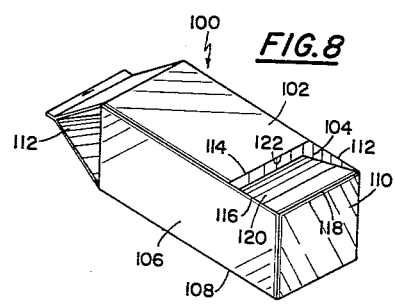
FIGURE 8 is a perspective view of a modified form of locker, the locker shown in this view also being suitable for use with the locker receiver shown in FIGURE 4.

The locker receiver 40 can be used with other forms of locker construction in lieu of the locker construction 42. For example, the locker designated generally at 100 in FIGURE 8 can be used in lieu of the locker 42. Except to the extent hereinafter described, the locker 100 is a pasteboard or cardboard container such as that described in U.S. Patent No. 2,750,095 that has been given a waterproofing treatment. The locker or container 100 is comprised of side walls 102 (hereinafter referred to as top wall 102), 104, 106, and 108. The locker or container 100 also includes a flat end wall 110 and a folded end wall 112. The top wall 102 is severed along a U-shaped line that includes a line segment 112 (along a juncture of the walls 102 and 104), a line segment 114 (extending between the side walls 104 and 106), and a line segment 116 (extending along a juncture of the top wall 102 and the side wall 106). The U-shaped line defined by the segments 112, 114, and 116 along with a straight line 118 extending between the extremities of such U-shaped line define a portion 120 of the top wall 102 that can be flexed upon the line 118 to afford an access opening 122 into the interior of the locker or container 100. Such flexure along the line 118 is preferably at least somewhat resilient in character so that the portion 120 will normally at least tend to close the opening 122. Alternatively, the top wall 102 can be cut along line 118 and the portion 120 entirely removed.

When using the locker 100 in lieu of the locker 42, the locker 100 is disposed in the receiver 40 in such a position that the side walls 106 and 108 of the locker 100 engage the walls 44 and 46 of the receiver 40 respectively, with the spring fingers 50 and 52 bearing resiliently against the side wall 104. The use of the litter locker 36 employing the locker 100 in lieu of the locker 42 is analogous to that previously described in that the opening 122 is exposed for the insertion of trash and litter into the locker 100 when the litter locker 36 is swung to extended position. The economical character of the locker 100 enables the same to be considered as disposable or expendable, and consequently the problem of removing trash and litter from the locker 100 does not occur. The locker 100 is simply replaced on becoming filled with trash and litter. The character of the locker 100 is such that it can constitute a convenient advertising medium by printing of ads thereon, with the advertiser making free distribution of the locker 100.

If desired, an empty milk carton can be closed at its folded end, and cut along lines 112, 114 and 116 to serve as locker 100. To facilitate cutting or severing along the lines 112, 114 and 116, milk cartons can be suitably scored (in a leak-free manner) along lines 112, 114 and 116 (or along an equivalent U-shaped path) to facilitate subsequent modification on becoming empty to a locker 100.

The size of the locker 100 can be such as to correspond to either the conventional one quart or the conventional one-half gallon size milk containers (preferably the latter) which it resembles. The locker 100 need not necessarily have precisely the shape illustrated thereof and can be of any generally rectangular configuration such as when the end wall 112 is flat as well as the end wall 110, such as conventional milk and orange juice cartons now used by dairies.

Figure 9:
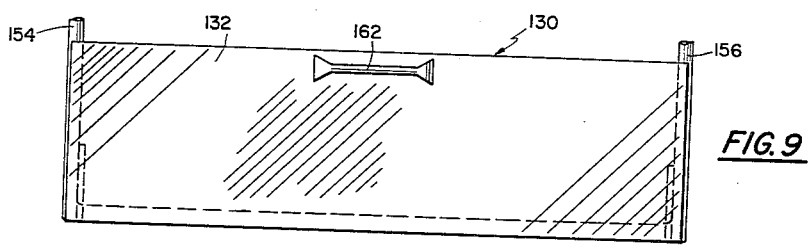
FIGURE 9 is a front elevational view of a modified form of locker receiver, with means for attaching the receiver to an automobile seat being broken away.
Figure 3:
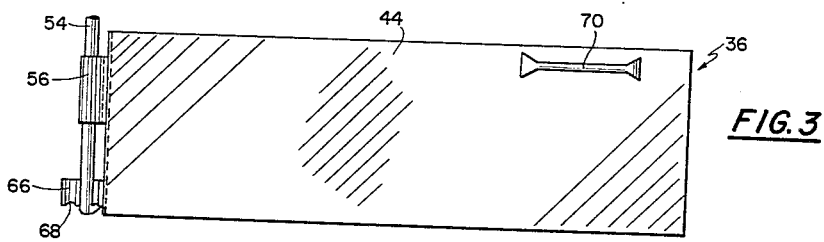
FIGURE 3 is an enlarged front elevation of one of the litter lockers shown in FIGURES 1 and 2, with a portion of the means for attaching the litter locker to the automobile seat being broken away.
Figure 4:
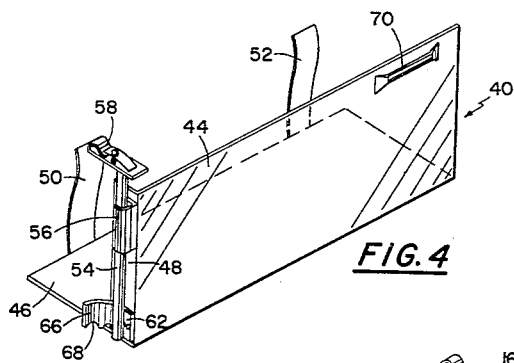
FIGURE 4 is a perspective view of a locker receiver together with means pivotally connected thereto for attaching the receiver to an automobile seat.
Figure 5:
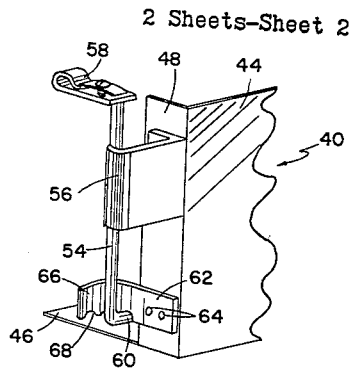
FIGURE 5 is an enlarged fragmentary perspective view of the means pivotally connected to the receiver for attaching the receiver to an automobile seat.
Figure 10:
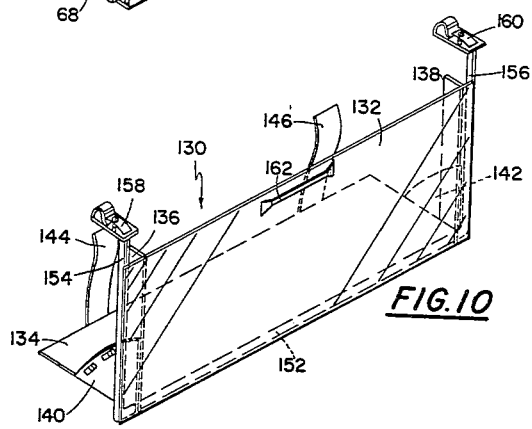
FIGURE 10 is a perspective view of the form of locker receiver shown in FIGURE 9; and, FIGURE 11 is an enlarged fragmentary perspective view of the means pivotally connected to the receiver shown in FIGURES 9 and 10.
Figure 11:
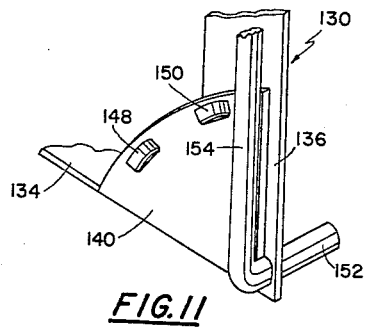

Attention is now directed to FIGURES 9, 10 and 11 wherein there is illustrated a modified form of locker receiver suitable for use with either the locker constructions shown at 42 and 100. The modified locker is designated generally at 130 and is comprised of a front wall 132 and a bottom wall 134. A pair of flanges 136 and 138 are suitably secured to the rear side of the front wall 132 and extend rearwardly therefrom, such flanges 136 and 138 being spaced inwardly from the lateral ends of the front wall 132. A pair of arcuate segments 140 and 142 are connected between the marginal edges of the bottom wall 134 and the flanges 136 and 138 respectively, as shown. A pair of spring fingers 144 and 146, shaped as shown and analogous to the spring fingers 50 and 52, are attached to the rear edge of the bottom wall 134. The walls 132 and 134, the arcuate segments 140 and 142, and the spring fingers 144 and 146 can be conveniently stamped as a unitary construction from sheet aluminum and formed as shown, such stamping operation also being such as to shape a plurality of spaced protuberances on the arcuate segments 140 and 142 such as the pair of protuberances 148 and 150 shown in connection with the arcuate segment 140.

Means is pivotally connected to the locker receiver 130 for attachment to the seat portion 28 of the seat structure 26. Such means is comprised of a U-shaped frame that includes a straight horizontal web portion 152 of circular cross section that is journaled through aligned openings in the flanges 136 and 138 adjacent the bottom wall 134, such U-shaped frame also including at the opposite ends of the web portion 152 upright sections 154 and 156, the upper ends of the sections 154 and 156 having rigidly attached thereto clamping devices 158 and 160 adapted to clamp the U-shaped frame rigidly to structural elements (not shown) in the bottom of the seat portion 28 of the seat structure 26.

The receiver 130 can be readily urged in its oscillation or pivotal movements by a pull 162 on the front wall 132, such pull being similar to the previously described pull 70.

The arcuate segments 140 and 142 are disposed respectively intermediate the flange 136 and the frame section 154, and the flange 138 and the frame section 156. The spacing is such that the protuberances on the arcuate segments 140 and 142 engage the frame sections 154 and 156 during oscillatory or pivotal movement of the locker receiver 130 about the horizontal axis defined by the horizontal section 152 of the U-shaped frame. For example, the protuberances 148 and 150 engage the frame section 154 so as to releasably retain the receiver 130 in predetermined angular relationships with respect to the U-shaped frame, it being noted that an increased amount of pressure is required to pivot the receiver 130 through a position such that the protuberance 150 must pass the U-shaped frame section 154.

While the walls 132 and 134, the flanges 136 and 138, the arcuate segments 140 and 142, and the spring fingers 144 and 146 are preferably aluminum in the interest of appearance, resistance to corrosion, and lightness of weight, the U-shaped frame sections 152, 154, and 156 as well as the clamps 156 and 160 are preferably steel in the interests of strength.

In use, the receiver 130 is mounted so that in its retracted position the front wall 132 is approximately flush with the forward edge of the seat portion 28 of the seat structure 26, with the receiver 130 being afforded sufficient vertical spacing so that the pivotally movable portions thereof can be oscillated or pivoted outwardly and forwardly about the horizontal axis defined by the frame section 152 to a position such that either the locker 42 or the locker 100 disposed in the receiver 130 will have the opening 88 or 122 thereof exposed for the insertion of trash and litter.

Although the preferred embodiments of the invention have been illustrated and described in substantial detail, it will be apparent to those skilled in the art that substantial departures can be made from the illustrated and described preferred embodiments of the invention without departing from the spirit of the invention. For example, other means than those illustrated and described can be provided for releasably retaining the litter lockers in predetermined oscillated or pivoted positions with respect to the seat structure. Also, where the litter locker is pivoted for movement about a vertical axis, additional support for the litter locker in the form of rollers mounted either on the receiver or on the seat structure can be provided. Such rollers can, if desired, cooperate with serpentine edges or protuberances so as to effect the function of releasably retaining the receiver in a plurality of predetermined positions. Accordingly, the actual scope of the invention should be ascertained on reference to the appended claims.

I claim:

1. In combination with an automobile having a seat spaced above the floor thereof, said seat having a forward edge, a receiver normally disposed in a retracted position intermediate the seat and the floor in spaced relation to the latter, said receiver having a substantially flat front wall that in the retracted position of the receiver is substantially vertical and substantially directly below the forward edge of the seat, means rigidly attached to and depending from the seat adjacent the leading edge of the latter for pivotally supporting the receiver in spaced relation above the floor, said means including a straight rod with said receiver being pivotally mounted thereon, said rod lying in a substantially vertical plane and being disposed adjacent a peripheral edge of the front wall of the receiver, said receiver being pivotal about the rod as an axis from said retracted position to an extended position projecting forwardly of the forward edge of the seat, coacting means carried by the rod and the receiver for releasably retaining the receiver selectively in its retracted and exposed positions, said receiver having an open top and a bottom wall extending rearwardly from the front wall thereof, a locker removably carried by the receiver and resting on the bottom wall thereof, and said locker having an open top exposed from forwardly of the seat when the receiver is in the extended position.

2. The combination of claim 1 including an upstanding spring finger at the rear of the bottom wall engaging and biasing the locker into engagement with the front wall.

3. The combination of claim 1, wherein the straight rod is vertical and is connected at its upper end to the seat, said automobile having a door adjacent to and at one end of the seat for direct access to the seat, said receiver being disposed under the seat at a position adjacent said one end of the seat, and said rod and the pivotal axis defined thereby being at an end of the receiver remote from the door.

4. The combination of claim 3, wherein said locker is of generally rectangular configuration including top, bottom and opposed end walls, said opening in the locker being in the top wall and adjacent one of the end walls, said one end wall and the bottom wall merging along a smooth curve at their juncture, the end wall opposite said one end wall being hinged to the top wall and normally closing such end of the locker, said end wall opposite said one end wall being swingable to a position opening such end of the locker, and means for holding the hinged end wall in its normal locker closing position.

5. The combination of claim 3, wherein said locker is of generally rectangular configuration and includes a top wall and opposed first and second end walls, said opening in the locker being in the top wall and adjacent the first end wall, and said locker having a plurality of openings adjacent the second end wall that are spaced from said opening with the locker being impervious intermediate said opening and the plurality of openings.

6. The combination of claim 1, wherein said first means comprises a U-shaped frame including spaced upstanding legs secured at their upper ends to the seat and said straight rod connecting the lower end of the legs, said straight rod being substantially horizontal and disposed adjacent the bottom of the front wall.

7. The combination of claim 6, wherein the locker is of disposable cardboard and said opening therein is defined by the locker including a top wall, said top wall being severed along a generally U-shaped line and flexible along a straight line connecting the opposite extremities of the U-shaped line and the straight line define a portion of the top wall that can be flexed from the normal position thereof to establish said opening.

References Cited in the file of this patent

UNITED STATES PATENTS

| | | |
|---|---|---|
| 601,744 | Wells et al. | Apr. 5, 1898 |
| 658,498 | Coston | Sept. 25, 1900 |
| 1,556,353 | Roedding | Oct. 6, 1925 |
| 1,625,011 | Wolfe et al. | Apr. 19, 1927 |
| 1,646,266 | Stoner | Oct. 18, 1927 |
| 2,201,333 | Carlson | May 21, 1940 |
| 2,210,347 | Story | Aug. 6, 1940 |
| 2,765,025 | Bakalic et al. | Oct. 2, 1956 |
| 3,072,245 | Faltin | Jan. 8, 1963 |
| 3,082,863 | Oharenko | Mar. 26, 1963 |

FOREIGN PATENTS

| | | |
|---|---|---|
| 510,968 | Great Britain | Aug. 11, 1939 |